US00RE35347E

United States Patent [19]

Bindon

[11] E Patent Number: Re. 35,347

[45] Reissued Date of Patent: Oct. 8, 1996

[54] IRON SIGHT WITH ILLUMINATED PATTERN

[75] Inventor: Glyn A. J. Bindon, South Lyon, Mich.

[73] Assignee: Trijicon, Inc., Wixom, Mich.

[21] Appl. No.: 105,377

[22] Filed: Aug. 10, 1993

Related U.S. Patent Documents

Reissue of:

[64] Patent No.: 5,065,519
Issued: Nov. 19, 1991
Appl. No.: 527,271
Filed: May 23, 1990

[51] Int. Cl.[6] ..... F41G 1/32

[52] U.S. Cl. ..... 33/241; 33/242

[58] Field of Search ..... 33/241, 242, 243, 33/233; 42/100, 103

[56] References Cited

U.S. PATENT DOCUMENTS

| | | | |
|---|---|---|---|
| 795,584 | 7/1905 | Daniel | 33/243 |
| 1,363,553 | 12/1920 | Barringer | 33/241 |
| 1,534,937 | 4/1925 | Foley . | |
| 1,982,058 | 11/1934 | King | 33/242 |
| 2,976,046 | 3/1961 | McCullough . | |
| 3,316,109 | 4/1967 | Rimbach . | |
| 3,342,743 | 9/1967 | Rosenberg . | |
| 3,366,573 | 1/1968 | Feuer . | |
| 3,436,242 | 4/1969 | Schaffner . | |
| 3,456,043 | 7/1969 | Emery . | |
| 3,668,455 | 6/1972 | Dale et al. . | |
| 3,701,900 | 10/1972 | Thuler . | |
| 3,706,543 | 12/1972 | Thuler . | |
| 3,784,817 | 1/1974 | James et al. . | |
| 3,817,733 | 6/1974 | Thuler . | |
| 3,820,248 | 6/1974 | Hayward . | |
| 3,908,055 | 9/1975 | Susuki et al. . | |
| 4,020,203 | 4/1977 | Thuler . | |

FOREIGN PATENT DOCUMENTS

| | | | |
|---|---|---|---|
| 125052 | 12/1918 | United Kingdom | 33/241 |

*Primary Examiner*—Christopher W. Fulton
*Attorney, Agent, or Firm*—Harness, Dickey & Pierce, P.L.C.

[57] ABSTRACT

An iron sight for night, day time and transition light sighting having a luminous source for night sighting and an accurately defined circle of a predetermined thickness surrounding such luminous source for daytime and transition light sighting and in one form having the luminous source supported in a receiving bore by an elastomeric material with the luminous source being accurately centered in the elastomeric material which is of a predetermined desired thickness to provide insulation from shock loads and a desired thickness and accurate circular shape for day time and transition light sighting.

32 Claims, 3 Drawing Sheets

IRON SIGHT WITH ILLUMINATED PATTERN

Matter enclosed in heavy brackets [ ] appears in the original patent but forms no part of this reissue specification; matter printed in italics indicates the additions made by reissue.

SUMMARY BACKGROUND OF THEINVENTION

The present invention relates to a sighting system primarily for handguns and more particularly to a sighting system in which daytime and transition light performance is improved for sights previously designed primarily for night use.

Related prior art is shown in the U.S. Pat. No. 4,020,203 issued Apr. 26, 1977 to O. Thüler for a night sighting lumination system for articles including weapon sights. The night sight comprises a self-luminous point or dot of light emanating from an insert assembly including a capsule having a radio-active luminescent source such as tritium. The present invention improves on the structure of the '203 Thüler patent and upon its application for a night sighting system for weapons.

Prior to the application of self-luminous sources for handgun night sights, many weapons already had a capability for daytime and transition light sighting by using three white dots on front and rear sight blades for sight alignment. Here one white dot is used on the front sight blade and two white dots are located in horizontal displacement on opposite sides of a center notch on the rear sight blade such that the three dots are seen by the user in a desired orientation for alignment with the target when the weapon is in proper aim. The white dots are usually obtained by the application of white paint in a shallow recess in the steel portion of the front and rear sight blades. Some weapons have used solid white plastic elements glued into deeper drilled holes.

Initially the application of self-luminous night sights, such as the '203 Thüler patent, to weapons simply added the night sight to the existing front and rear sight blades. The daytime function thus continued to be the usual alignment of the top of the front blade with the top edge of the notch of the rear blade. Some front blades contained a red plastic insert or painted portion with the luminous element or dot placed inside the plastic insert or painted portion.

Other prior an sights have used painted rings or ring shaped decal like members applied around each night sight element. These rings are generally thin lines of large diameter and often irregular shape which because of their size and irregular shape are perceived as rings rather than dots; such perception can be distracting rather than helpful to the user. Further, the applied rings could wear off under heavy duty use and/or rugged environments.

In the present invention a structure is provided having improved daytime and transition light sighting which is obtained in pan by inlaid white circles around the luminous elements which circles are accurately defined in contour and size to more nearly provide the appearance of white dots. In this regard the advantages of the synthetic sapphire lens structure of the '203 Thüler patent are retained; these include optical clarity, extreme hardness and durability, and a very sharply defined round luminous dot upon which the eye can focus while aiming during night and/or transition light sighting.

In addition, however, the structure of one form of the present invention provides improved shock load protection of the luminescent glass capsule containing the radioactive tritium, i.e. a pressurized hydrogen gas isotope. These shock loads are especially very high on automatic pistols due to both weapon firing recoil and the metallic slide stops which are part of the self-loading actuation system. Other shock loads could arise such as accidental impact of the weapon against a hard surface.

The structure of the present invention also improves the protection of the glass capsule containing the tritium gas during the installation of the steel blades into the weapon.

Thus it is an object of the present invention to provide a sighting structure for a weapon having improved daytime and transition light sighting.

It is another object of the present invention to provide a sighting structure for a weapon utilizing a luminescent glass capsule including a radioactive tritium source and having a mounting with improved shock load protection.

It is a general object to provide an improved sighting structure for a weapon.

Other objects, features, and advantages of the present invention will become apparent from the subsequent description and the appended claims, taken in conjunction with the accompanying drawings, in which:

Figure 1:
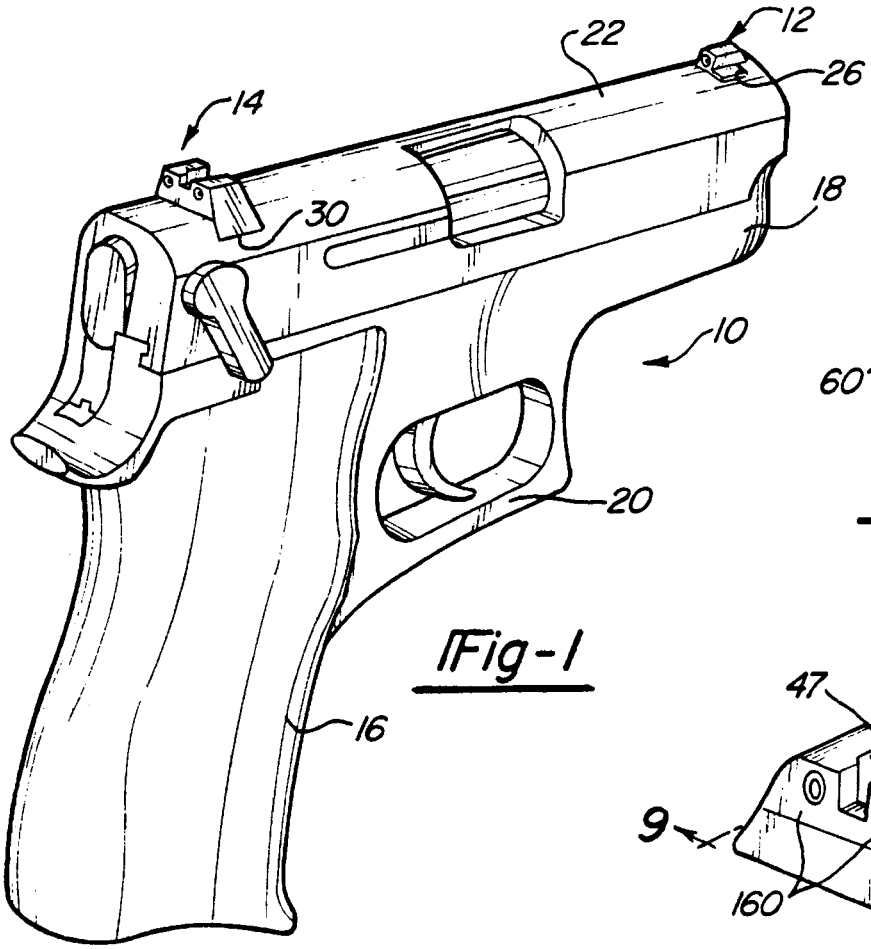
FIG. 1 is a pictorial view of a typical handgun (semi-automatic pistol) illustrating the use of the improved three-dot sighting system of the present invention.

Looking now to FIG. 1 a typical handgun 10 is shown having aiming sights including a front sight blade 12 and a rear sight blade 14. The details of the handgun 10 are well known and do not constitute a part of the present invention and hence have been omitted for purposes of simplicity. The handgun 10 has a handle 16, a lower receiver 18, a typical trigger mechanism 20, and a slide 22 slidably supported on the lower receiver 18.

The front sight blade 12 is located at the front of the slide 22 while the rear sight blade 14 is located at the rear of the slide 22. The front blade 12 has a mounting base 24 which is wedge shaped or angulated at its sides to provide for a press fitted dovetail type assembly in a slot 26 at the forward end of slide 22. In similar fashion the rear blade 14 has a mounting base 28 which is wedge shaped or angulated at its sides to provide for a press fitted dovetail type assembly in a slot 30 at the rearward end of slide 22.

Front blades are sometimes made integral with the slide or main gun barrel.

For purposes of durability and strength the front and rear sight blades 12 and 14, respectively, and the slide 22 are made of a strong, durable metal, i.e. heat treated, hardened steels.

Figure 6:
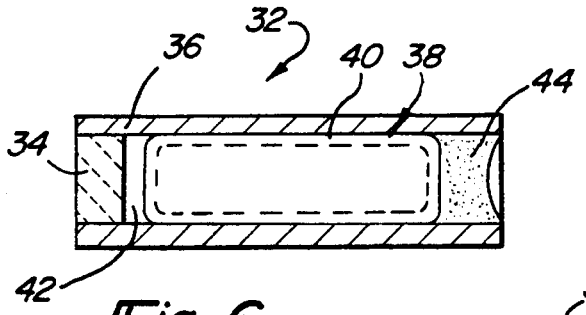
Fig-6 PRIOR ART
FIG. 6 is a longitudinal sectional view of a prior art insert assembly or capsule including a radio-active luminescent source.
Figure 7:
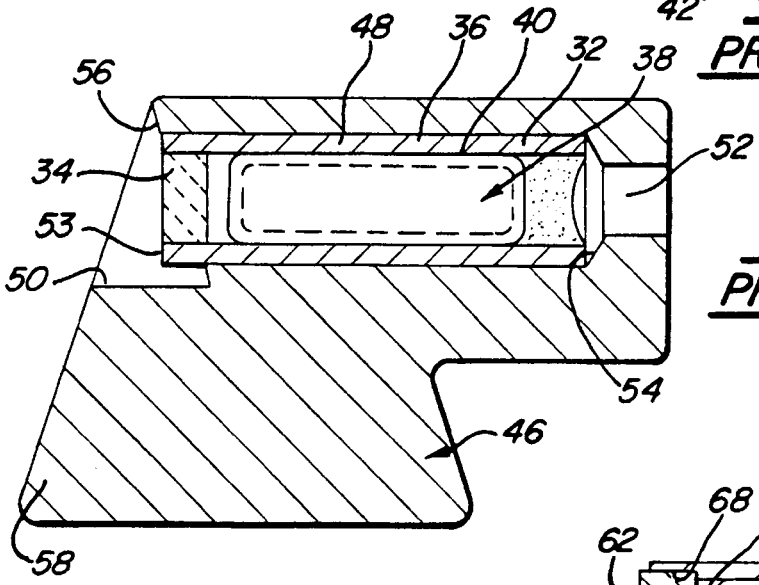
Fig-7 PRIOR ART
FIG. 7 is a sectional view of a prior art rear sight blade with the prior art insert assembly or capsule of FIG. 6.

As noted night sighting is provided by use of an insert assembly which comprises a capsule having a radioactive luminescent source, i.e. tritium. These inserts are relatively delicate and can be damaged by the high installation loads on the sight blades and/or by the residual stresses in combination with even routine shock loads in operating the weapon. A typical prior art capsule or assembly is shown in FIGS. 6 and 7. Looking now to FIG. 6, a luminescent capsule 32 is shown and includes a sapphire lens 34 which is press fitted in the front of a tubular aluminum housing 36 of circular cross-section. In a typical installation, the aluminum housing 36, and hence capsule 32, has an outside diameter of 0.075 inch and overall length of 0.256 inch. The sapphire lens 34 has a diameter of 0.059 inch. A radioactive source (GTLS, Gaseous Tritium Luminous Source) 38 comprises a sealed glass tube 40 having the gaseous, radio-active tritium. The glass tube 40 has an outside diameter of 0.060 inch and length of 0.197 inch. The glass tube 40 is typically held in place by a silicone adhesive between the walls of the glass tube 40 and the aluminum tube 36. An air space 42 is provided between the sapphire lens 34 and the glass tube 40 and the opposite end portion 44 of the tube 36 is sealed via the same silicone adhesive.

A typical prior an assembly of the capsule 32 with a rear sight blade 46 is shown in FIG. 7. Here the aluminum tube 36, which is precision machined, is located in a precision bore 48 with a close tolerance, clearance fit. The capsule 32 is bonded therein using an adhesive such as Loctite Black Max, a rubber modified cyano-acrylate adhesive. As in the embodiment of FIG. 2, the rear sight blade 46 has a center notch (such as notches 47 and 147 in FIGS. 2 and 10) and a pair of bores 48 on opposite sides thereof. The bores 48 terminate at their forward ends in an enlarged crescent shaped notch 50) which extends across the face of the blade 46, intersects the center notch and encompasses both of the bores 48 in a single cavity; at their rearward ends, the bores 48 terminate in reduced diameter bores 52. Rear bores 52 provide venting during installation and permit excess adhesive to escape and also provide locating surfaces 54 to generally locate the capsules 32 with their forward ends 53 within the crescent notch 50 and generally in line with an irregular, inclined outer surface portion 56 of the crescent notch 50. The crescent shaped notch 50 is provided to shade the sighting surfaces during aiming. No such crescent shaped notch 50 is utilized in the embodiment of FIG. 2.

Figure 3:
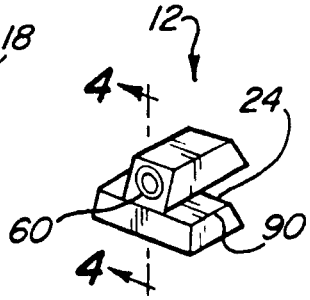
FIG. 3 is a pictorial view of the front sight blade assembly of the handgun of FIG. 1.
Figure 2:
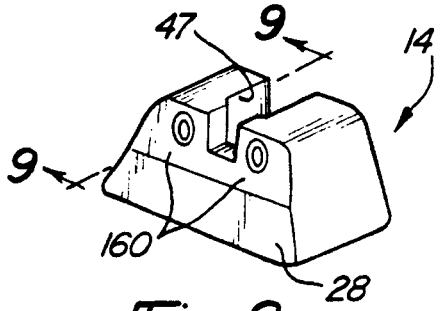
FIG. 2 is a pictorial view of the rear sight blade assembly of the handgun of FIG. 1.

For assembly purposes the rear sight blade 46 is provided with a base 58 having wedge shaped or angulated sides to facilitate a press fitted dovetail type assembly as noted with the sight blades 12 and 14 in FIGS. 1–3.

Frequently the assembly methods used to insert the front and rear blades 12 and 14 and blade 46 utilize substantial deformation forces when dovetail press fits, staking and/or riveting operations are involved, particularly with heat treated steels. The result can be substantial installation and/or residual stresses on the front and rear blades 12 and 14.

Steel sight blades with only the GTLS glass tube, such as glass tube 38 without support tube 36, are often installed directly into bores in the sight blades as lower cost sighting systems. The heavy forces used at assembly with dovetail press fits and staking or riveting would often break or crack the glass capsule. When the glass tube has a very fine crack in it, the gaseous tritium, hydrogen isotope, begins to leak out and the lamp eventually goes out. However, the time taken for the lamp to go out could be a week or more because the hydrogen has to permeate through the adhesive. This makes quality control difficult because many pans could be assembled and sent, into the field before the failures are detected. While having greater strength and resistance to failure, the prior an insert assembly 32 with its close tolerance fit in bore 48 could also result in failures through installation and/or shock loading.

Weapons with day sighting systems sometimes provide all of the white dots to be the same size. An example is three dots of 0.075 inch diameter. As noted the night sight version (capsule 32) for such a weapon would have three luminous sight assemblies with each having 0.075 inch outside diameter and 0.256 inch in overall length fitting into the bores such as bore 48 as shown and described with regard to the embodiment of FIGS. 6 and 7.

Some weapon manufacturers prefer to use a larger white dot in the front sight blade. An example is a dot of 0.078 inch diameter for the front blade and a pair of dots of 0.065 inch diameter for the rear blade. This makes the front dot more pronounced in appearance to the user. Here the ratio of the dot sizes is in the range around 1.20:1.

Figure 6A:
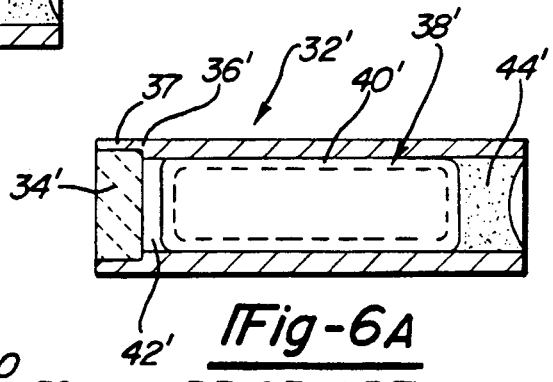
Fig-6A PRIOR ART
FIG. 6A is a view similar to that of FIG. 6 depicting a modified prior art luminescent source.

An example for night sighting apparatus for a rear sight is the use of a sapphire lens (such as lens 34) of a diameter of 0.051 inch while the remainder of the assembly is still 0.075 inch outside diameter and an overall length of 0.256 inch. This would be the construction of the capsule or insert assembly for the rear sight blade. FIG. 6A depicts s prior art construction in which a contrasting larger dot is used for the front sight blade. In the embodiment of FIG. 6A elements similar to like elements in the embodiment of FIG. 6 have been given the same numeral designation with the addition of prime and for simplicity all elements have not been described. Here in the capsule 60' the forward end of the tube 36' is counterbored as at 37 to accept a sapphire lens 34' of larger diameter, being 0.063 inch. Except for that the capsule 60' and 60 are the same. Note that in the prior art capsules 40, 40' the lens 34, 34' is generally flush with the end of the support tube 36, 36'.

Thus a sapphire lens diameter of 0.051 inch could be used for the rear sight blade and 0.063 inch for the front sight blade, while the remainder of the assembly is still the same, i.e. 0.075 inch outside diameter and 0.256 inch length. In both cases the capsules (such as 32) would be located in bores (such as 48) of a 0.078 inch diameter. This would be applied to the luminous sight capsule or insert assembly for the front and rear sight blades where rear night dots smaller than the front night dot is desired. In such cases the ratio of the night dot sizes is generally within a range of around 1.235:1. While this is proximate to the desired ratio for night use, the thin ring of aluminum via housing 36 around the sapphire lens 34 does not have the desired appearance for contrast or size for day sighting. In this regard the rear night dots would have a ring of aluminum of around 0.012 inch width while the front ring would be only 0.006 inch in width.

As noted, in order to improve the day sighting characteristics of the prior art night sight system, it has been known to apply a white circle via paint, decal, etc. around the sapphire lens 34. With structures such as that shown in FIGS. 6 and 7, the results have been excessively large circles and/or circles of irregular shape. In this regard it should be noted that with prior art, inserts or capsules such as capsule 32 the sapphire lens 34 is substantially flush with the outer end of the aluminum tube 36. At the same time the enlarged crescent shaped notch 50 of the sight blade 46 is not annular and does not provide the desired defined, circular shape. In the present invention a construction has been provided which facilitates the application of a day lighting white circle of desired size and substantially regular contour.

Figure 4:
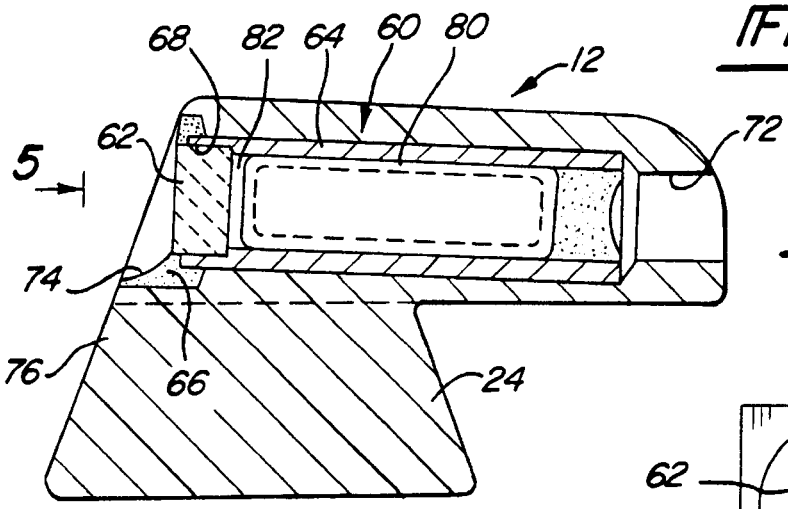
FIG. 4 is a sectional view to enlarged scale of the front sight blade of FIG. 3 taken in the direction of the arrows 4—4 in FIG. 3 and illustrates one form of the present invention.
Figure 8:
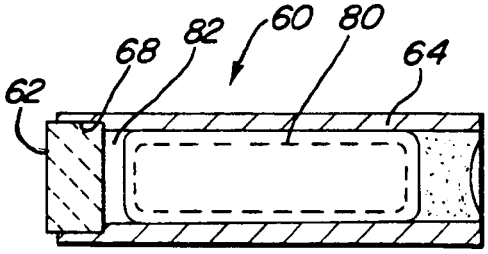
FIG. 8 is a longitudinal sectional view of the insert assembly utilized in the front sight blade of FIGS. 3 and 4 and depicting one form of improved structure of the present invention.

Looking now to FIGS. 4 and 8 the luminous sight insert or capsule 60 is generally maintained the same as the prior art capsule 50. Here, however, the diameter of the sapphire lens 62 is 0.063 inch; while the aluminum tube 64 has an outside diameter of 0.075 inch and overall length of 0.256 inch it is counterbored at its forward end 68 to accommodate the larger diameter of the sapphire lens 62, At the same time the counterbored front end 68 is controlled in depth such that the lens 62 extends outwardly at least around 0.012 inch. The receiving bore 70 is 0.078 inch in diameter. In addition the sight blade 12 has a counter bore 66 of a diameter of 0.094 inch which accurately, concentrically surrounds the precision bore 70 which receives the luminous capsule 60. The capsule 60 will include the glass tube 80 having the gaseous tritium and air gap 82 assembled in the manner previously described regarding prior art capsule 32.

A rear, reduced diameter bore 72 permits venting and expulsion of any excess adhesive from installation. Rear bore surface 74 acts to locate the capsule 60 within bore 70 with lens 62 located within counterbore 66.

The cavity defined by counter-bore 66 and the forward end of capsule 60 can now be filled with white paint to define a white ring 74. A preferred white paint is Sherwyn-Williams Polane polyurethane enamel, linear white F63 W12 with Polane catalyst V66 V27. A solvent wipe is performed while the paint is uncured, using Polane reducer R7 K84. In this regard, then, the outer surface of the sapphire lens 62 can be cleaned free of the paint and its outside diameter will accurately define the inside diameter of the white ring 74. At the same time, the accurately formed counterbore 66 will precisely define the outside diameter of the white ring 74. The counterbore 66 is also inset by at least around 0.015 inch from the outer inclined surface 76 to inhibit distortion of areas of the white ring 74.

Figure 5:
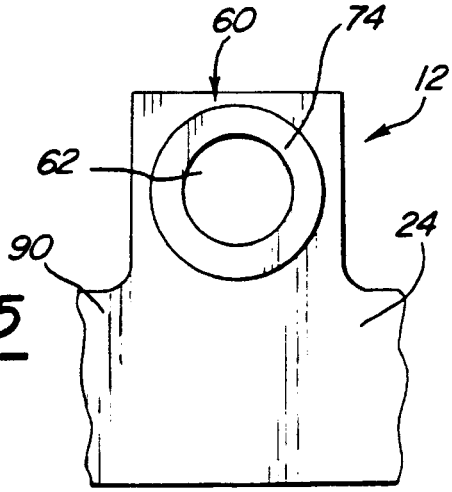
FIG. 5 is a fragmentary elevational view of the front sight blade of FIGS. 3 and 4 taken in the direction of the arrow 5 in FIG. 4.

FIG. 5 is a view that the operator sees in which the front sight blade 12 is typically blackened (black oxide) steel.

The resulting system is a front sight blade 24 with an inlaid white paint dot or ring 74 of 0.094 inch outside diameter surrounding a clear sapphire lens 62 of 0.063 inch diameter. The ratio of the outside diameter of white ring 74 to the diameter of the sapphire lens 62 is 1.49:1. With this ratio, the white surface area of ring is 120% of the sapphire area, and the white daytime and transition lighting performance of the system is comparable to the larger plain white dot of 0.078 inch diameter that it replaces in the day only system.

Figure 9:
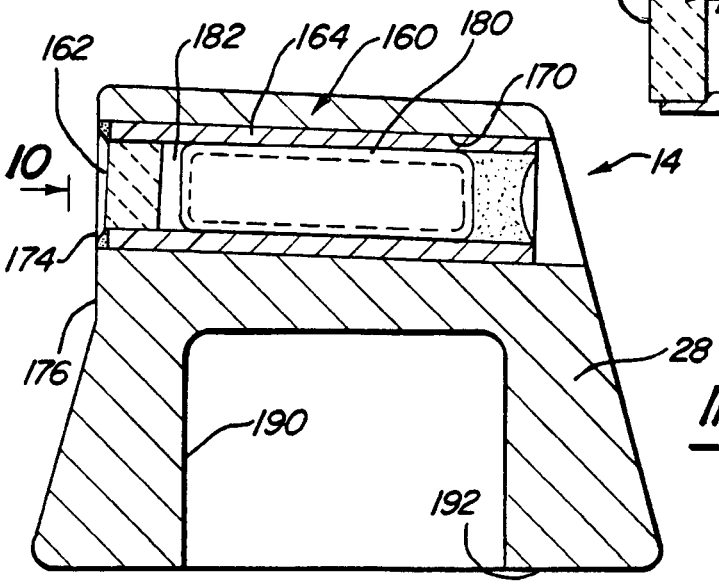
FIG. 9 is a sectional view to enlarged scale of the rear sight blade of FIG. 2 taken generally in the direction of the arrows 9—9 in FIG. 2.
Figure 11:
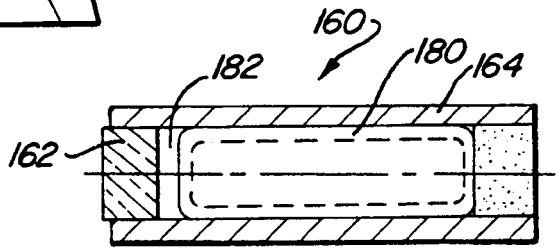
FIG. 11 is a longitudinal sectional view of the insert assembly utilized in the rear sight blade of FIGS. 2 and 9.

The embodiment of FIGS. 9 and 11 depict the rear sight blade 14 embodying features of the present invention. In the embodiment of FIGS. 9 and 11 components similar to like components in the embodiment of FIGS. 3 and 4 have been given similar numeral designations with the addition of one hundred.

The capsule 160 includes the tritium filled glass tube 180 and air gap 182 assembled as previously discussed.

Here sapphire lens 162 is 0.051 inch in diameter with the aluminum tube 164 having its outside diameter of 0.075 inch and overall length of 0.256 inch. The sapphire lens 162 extends outwardly at least around 0.012 inch from the forward end 168 of the tube 164. The precision receiving bore 170 can be a straight through bore of uniform diameter of 0.078 inch with the forward end of the sapphire lens 162 located within the confines of the bore 170. Again the cavity deemed by the bore 170 and the recess resulting from the extension of the sapphire lens 162 beyond the tube 164 can be filled with paint as noted in the discussion of the front sight blade 24.

Figure 10:
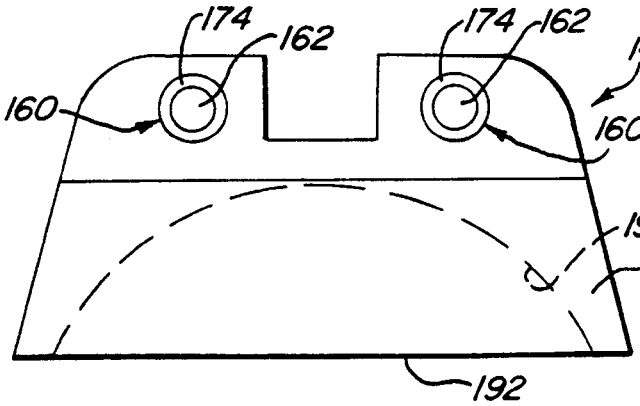
FIG. 10 is an elevational view of the rear sight blade of FIG. 9 taken in the direction of the arrow 10 in FIG. 9.

The resulting system is the rear blade of FIGS. 9 and 10 with two inlaid white paint dots 174 of 0.078 inch outside diameter surrounding a clear sapphire lens of 0.051 inch diameter. The ratio of the two diameters is around 1.53:1. This maintains the larger surface area of white compared to the clear sapphire lens as described for the front sight blade above.

FIGS. 9 and 10 show a further improvement of a blade assembly as specifically applied to the rear sight blade 14. Here in order to make the sight blade 14 more flexible, a slot 190 is milled into the bottom surface 192.

The flexibility of the rear blade 14 provided by the slot 190 permits interference fits to be used without the attendant increase in force required for assembly. This feature is particularly important for blades that are used to fit onto weapons which have already had an original equipment sight blade installed. When the original blade is pressed out, it is often found that the weapon has a slightly stretched or oversize dovetail slot such as slots 26 and 30. Thus with slot 190 a greater interference can be provided to accommodate differences in slot sizes without excessive installation loads being required. Note that the slot 190 is generally in the base portion 28.

In the embodiment of FIG. 3, the base 24 extends outwardly to define a shoulder 90. The shoulder 90 added to the base 24 of the front sight blade 12 allows the shoulder 90 to carry the staking or installation forces at assembly. In the event of riveting of the structure then the shoulder 90 provides means for reacting the riveting loads. For example if an anvil were placed at the top surface of the sight blade 12 instead of on the shoulder 90, crushing forces could deform the shape of the front sight blade 12. These deformations could be sufficient to distort the aluminum tube 64 and then fracture the glass tube 80.

Figure 12:
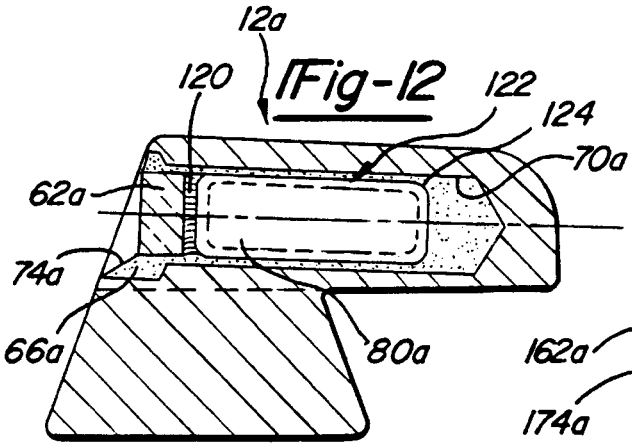
FIG. 12 is a longitudinal sectional view, to enlarged scale, of a front sight blade of a different form of the present invention.
Figure 13:
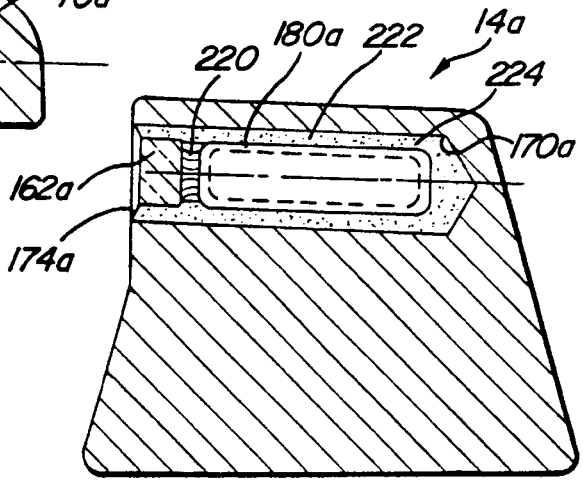
FIG. 13 is a longitudinal sectional view, to enlarged scale, of a modification of the form of invention of FIG. 12 for a rear sight blade.

As noted one of the concerns with night sighting devices is to increase the shock isolation of the tritium filled glass tube. Another is to provide the accurately defined and properly sized white circle for day time and transition fight sighting. Both problems are addressed in the embodiments shown in FIGS. 12 and 13. In the description of FIGS. 12 and 13 elements similar to like elements in the embodiments of FIGS. 4 and 9 have been given the same numeral designations with the addition of the letter postscript "a" and one hundred added for elements of FIG. 13 relative to similar elements of FIG. 12.

This form of the present invention essentially omits the use of the aluminum tube and replaces it with a thick layer of silicone elastomer/adhesive. The preferred silicone for this application is a fluoro-silicone manufactured by Dow-Corning and identified by their product number DC 730. The DC 730 material is in the form of a non-flowing white paste, consisting of a silicone compound which cures upon exposure to air. The silicone cures from a paste into a silicone rubber-like material which has good bond and tear properties in addition to its rubber-like shock absorbing properties. In addition the DC 730 silicone provides the desired white appearance. The whiteness also reflects more useful GTLS light through the sapphire lens, thereby increasing its brightness.

First the sapphire lens 62a is attached to the tritium filled glass tube 80a. Two constructions can he used. An optically clear anaerobic ultra-violet curing cement like Dymex 415 provides a very thin bond line with fast and excellent results. A larger gap system can use a molded portion 120 of optically clear silicone anaerobic ultra-violet cured silicone compound Dow Corning Q3-6662. The latter structure provides greater shock absorbing space between the sapphire lens 62a and the glass tube 80a. In the front sight blade 12a, the glass tube 80a and lens 62a are of a diameter of 0.063 inch. The bore 70a is 0.078 inch in diameter while counterbore 66a is 0.094 inch in diameter. The length of the glass tube 80a can be the same as that in FIG. 4. In the rear sight blade 14a, the diameter of the glass tube 180a and of sapphire lens 162a is 0.051 inch. The bore 170a is 0.064 inch in diameter. Again the length of the glass tube 180a can be the same as that in FIG. 9. Thus the resultant sights of FIGS. 12 and 13 have essentially the same appearance to the operator as those shown in FIGS. 2 and 3 with similar ratios of white ring to the sapphire lens diameter.

The silicone paste has certain advantages for this application. The assembly 122 of lens 62a and glass tube 80a once centered will remain in center until the silicone has properly cured into a white rubber mounting. The thicker layer 124 of estomeric material will give a better shock protection for the glass tube 80a, and at the time the desired white ring 74a is provided surrounding the sapphire lens 62a. However, there is a strong tendency for the assembly 122 of lens 62a and glass tube 80a to be eccentric upon insertion in the bore 70a.

In this regard the silicone is first placed in the drilled cavity 70a, and then the assembly 122 is pushed into place, the silicone paste must be extruded over the surface of the assembly 122. This is an annular flow passage. Thus the eccentricity characteristic would prevail if the assembly 122 were pushed into the bore 70a filled with DC 730 silicone paste. In the absence of means to keep the assembly 122 centered, it tends to take the path of least resistance and moves radially to one side of the bore 70a. In the present invention this problem is solved by rotating the assembly 122 to develop hydrodynamic forces which would properly center the assembly 122 in the bore 70a.

Thus the assembly 122 is rotated as it is being pushed into the silicone paste in bore 70a. In this regard a small quantity of silicone paste is placed at the bottom of the bore 70a using a syringe. A metered portion is used so that there will be little excess.

In one form of the invention the advance rate into the silicone paste was a controlled rate of 0.0134 inches per second while being rotated at between 1200 and 2400 rpm. The rotational speed is chosen so that the hydrodynamic centering forces are greater than the extrusion eccentricity de-centering forces thus enabling a stable accurately centered, concentric installation. While no one means has been determined as being preferred for gripping the assembly 122 for rotation and insertion, it is believed that a micro vacuum device could be used and/or a flexible rod with a [remoable] *removable* adhesive could be employed.

Figure 14:
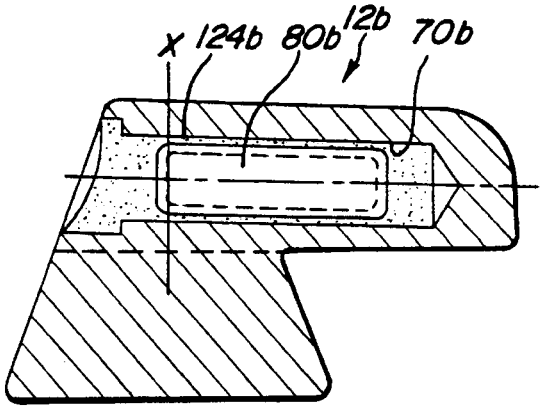
FIG. 14 is a longitudinal sectional view, to enlarged scale, of another modification of the present invention, as applied to a front sight blade
Figure 15:
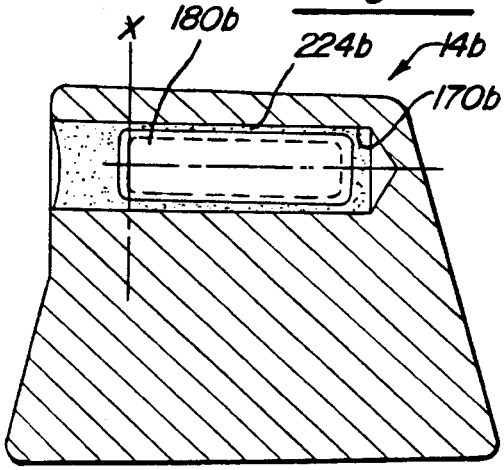
FIG. 15 is a longitudinal sectional view, to enlarged scale, of a variation of the form of the present invention of FIG. 14, as applied to a rear sight blade.

A variation of the embodiment of FIGS. 12 and 13 is shown in FIGS. 14 and 15 where the gaseous tritium filled glass tube is used alone without a sapphire lens. Here components similar to like components in the embodiment of FIGS. 12 and 15 are given the same numeral designation with the addition of the letter postscript "b". The receiving bores 70b, 170b are first painted white inside. Clear ultra violet cured urethane type anaerobic clear optical cement like Dymex 415, is placed in the bores [70] *70b*, 170b after the white paint has dried and cured. The glass tubes 80b, 180b are then installed into the bores 70b, 170b into the position shown. The same rotary motion developed for the silicone paste is generally suitable, but the Dymax 415 is of a high viscosity and if the glass tubes 80b, 180b are allowed to set for very long, the glass tubes may settle under the influence of gravity to one radial side or to the bottom of the associated bore. This is prevented by immediately curing the system with a short cycle of intense ultra-violet light.

Two steps of curing can be used. The centered glass tubes 80b, 180b are below the surface of the optical cement, and the initial application of adhesive is taken to the level marked (X) in FIGS. 14 and 15. This is cured immediately before the glass tubes 80b, 180b can move. The second application fills the cavity to the final level shown, and this is also cured.

Alternatively the bores 70b, 170b can be filled to the level X with the DC 730 silicone paste and after setting the remainder can be filled with the optically clear cement such as Dymex 415.

In the embodiment of FIGS. 14 and 15 the glass tubes 80b, 180b and bores 70b, 170b are of the same diameter and length as that of the related elements of FIGS. 12 and 13. Note that the bores 70a, 70b, 170a, 170b are shown to be blind bores; through bores could be used and temporarily blocked during the installation of the assemblies 122, 222 and glass tubes 80b, 180b.

While the silicone paste noted has been used in bonding of the glass tube 38 to the aluminum tube 36 in prior an applications (as shown in FIGS. 6 and 7), the layer has been deliberately thin in view of the selectively close tolerance fits involved. In the present invention of FIGS. 12–15, a thick walled layer is provided to give insulation from shock and the desired size and accurate circular shape of the white ring for day sighting. At the same time, if the thickness of the radial layer was too great the centering action could not be accomplished in the manner noted. Thus a radial wall thickness of the layer surrounding the glass tube 80a, 80b, 180a, 180b of between around, 0.006 inch and around 0.008 inch has been found satisfactory.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An iron sight for a hand weapon comprising:

a sight blade adaptable to be located on the weapon and having a first side *of said sight blade* adapted to be viewed by the operator in sighting the weapon, a bore located in said sight blade [at] *and extending in an axial direction to* said first side, a self luminous capsule located in said bore in said sight blade for providing night sighting and having a generally circular light transmitting end, a counterbore located concentrically with said bore at said first side and defining with said capsule a ring having generally precise inside and outside diameters surrounding said capsule and said light transmitting end and defining a predetermined radial width, a substantially white material located within and generally filling said ring to define a white ring, *said white material extending at least in part substantially to said first side of said sight blade to locate said white ring substantially at said first side of said sight blade* to provide improved day sighting *for the operator when sighting the weapon.*

2. The iron sight of claim 1 further comprising:

an elastomeric layer surrounding said capsule and resiliently supporting and centering said capsule within said bore.

3. The iron sight of claim 1 with the area of said white ring being around 120% of the area of said light transmitting end of said capsule.

4. The iron sight of claim 1 with the outside diameter of said white ring being around 149% of the diameter of said light transmitting end of said capsule.

5. The iron sight of claim 1 with said light transmitting end of said capsule having a diameter of around 0.063 inches, and said white ring having an inside diameter of around 0.063 inches and an outside diameter of around 0.094 inches.

6. An iron sight for a hand weapon comprising:

a sight blade adaptable to be located on the weapon and having a first side *of said sight blade* adapted to be viewed by the operator in sighting the weapon, a bore located in said sight blade [at] *and extending in an axial direction to* said first side, a self luminous capsule located in said bore in said sight blade for providing night sighting and having a generally circular light transmitting end, a counterbore located concentrically with said bore at said first side and defining with said capsule a ring having generally precise inside and outside diameters surrounding said capsule and said light transmitting end and defining a predetermined radial width, a substantially white material located within and generally filling said ring to define a white ring, *said white material extending at least in part substantially to said first side of said sight blade to locate said white ring substantially at said first side of said sight blade* to provide improved day sighting *for the operator when sighting the weapon,* the area of said white ring being around 120% of the area of said light transmitting end of said capsule, the outside diameter of said white ring being around 149% of the diameter of said light transmitting end of said capsule.

7. The iron sight of claim 6 with said light transmitting end of said capsule having a diameter of around 0.1363 inches, and said white ring having an inside diameter of around 0.063 inches and an outside diameter of around 0.094 inches.

8. An iron sight for a hand weapon comprising:

a sight blade adaptable to be located on the weapon and having a first side *of said sight blade* adapted to be viewed by the operator in sighting the weapon, a bore located in said sight blade [at] *and extending in an axial direction to* said first side, a self luminous capsule supported in said sight blade for providing night sighting and having a generally circular light transmitting end of a predetermined diameter and located concentrically within said bore at said first side and defining with said bore an axially extending cavity of a circular shape having generally precise inside and outside diameters surrounding said light transmitting end and defining a predetermined radial width, said predetermined diameter being said inside diameter, a substantially white material located within and generally filling said circular cavity to define a white ring, *said white material extending at least in part substantially to said first side of said sight blade to locate said white ring substantially at said first side of said sight blade* to provide improved day sighting *for the operator when sighting the weapon.*

9. The iron sight of claim 8 with said capsule including a general tubular housing and a separate light transmitting member supported in said housing, said light transmitting member defining said light transmitting end with said light transmitting end extending axially outwardly and spaced from the adjacent end of said tubular housing.

10. The iron sight of claim 8 with the area of said white ring being around 120% of the area of said light transmitting end of said capsule.

11. The iron sight of claim 8 with the outside diameter of said white ring being around 149% of the diameter of said light transmitting end of said capsule.

12. The iron sight of claim 8 with said light transmitting end of said capsule having a diameter of around 0.063 inches, and said white ring having an inside diameter of around 0.063 inches and an outside diameter of around 0.094 inches.

13. The iron sight of claim 8 with said outside diameter of said white ring being around 153% of said inside diameter and hence of said predetermined diameter of said light transmitting end of said capsule.

14. The iron sight of claim 8 with said predetermined diameter of said light transmitting end of said capsule and hence said inside diameter being around 0.051 inches, and said white ring having an inside diameter of around 0.051 inches and an outside diameter of around 0.078 inches.

15. In an iron sight for a hand weapon and having a sight blade adaptable to be located on the weapon, a self luminous tube located in a bore in the sight blade for providing night sighting and having a generally circular light transmitting end, the self luminous tube being of a glass like substance filled with a gaseous radio-active substance such as Tritium, the method of assembling the tube in the bore comprising the steps of:

forming the bore to be of a diameter having a preselected limited clearance with the tube, locating a preselected quantity of elastomeric material in the bore, rotating the tube at a preselected speed as it is moved axially into the bore to hydrodynamically center itself causing the elastomeric material to hold the tube in its centered position.

*16. A sight for a hand weapon comprising:*

*a sight blade adaptable to be located on the weapon and having a first side of said sight blade adapted to be viewed by the operator in sighting the weapon,*

*a bore located in said sight blade and extending in an axial direction to said first side,*

*a self luminous capsule supported in said sight blade for providing night sighting and having a generally circular light transmitting end of a predetermined diameter and located concentrically within said bore at said first side and defining with said bore an axially extending cavity of a circular shape having generally precise inside and outside diameters surrounding said light transmitting end and defining a predetermined radial width, said predetermined diameter being said inside diameter, a substantially white material located within and generally filling said circular cavity to define a white ring to provide improved day sighting, said substantially white material being located wholly inside said bore and extending at least in part in said axial direction substantially to said first side.*

*17. The iron sight of claim 16 with said capsule including a general tubular housing and a separate light transmitting member supported in said housing, said light transmitting member defining said light transmitting end with said light transmitting end extending axially outwardly and spaced from the adjacent end of said tubular housing.*

*18. The iron sight of claim 16 with the area of said white ring being around 120% of the area of said light transmitting end of said capsule.*

*19. The iron sight of claim 16 with the outside diameter of said white ring being around 149% of the diameter of said light transmitting end of said capsule.*

*20. The iron sight of claim 16 with said light transmitting end of said capsule having a diameter of around 0.063 inches, and said white ring having an inside diameter of around 0.063 inches and an outside diameter of around 0.094 inches.*

*21. The iron sight of claim 16 with said outside diameter of said white ring being around 153% of said inside diameter and hence of said predetermined diameter of said light transmitting end of said capsule.*

*22. The iron sight of claim 16 with said predetermined diameter of said light transmitting end of said capsule and hence said inside diameter being around 0.051 inches, and said white ring having an inside diameter of around 0.051 inches and an outside diameter of around 0.078 inches.*

*23. A sight for a weapon comprising:*

*a sight blade adaptable to be located on the weapon and having a first side of said sight blade adapted to be viewed by the operator in sighting the weapon,*

*a bore located in said sight blade and extending in an axial direction to said first side,*

*a self luminous capsule supported in said sight blade for providing night sighting and having a generally circular light transmitting end of a predetermined diameter and located concentrically within said bore at said first side and defining with said bore an axially extending cavity of a circular shape having generally precise inside and outside diameters surrounding said light transmitting end and defining a predetermined radial width, said predetermined diameter being said inside diameter, a substantially white material located within said circular cavity to define a white ring to provide improved day sighting, said substantially white material being located inside said bore at said first side, and wherein said white material extends axially inwardly substantially from said first side of said side blade in order to facilitate the ease of visibility of said white material to the .operator when sighting the weapon.*

*24. The sight of claim 23 with said capsule including a general tubular housing and a separate light transmitting member supported in said housing, said light transmitting member defining said light transmitting end with said light transmitting end extending axially outwardly and spaced from the adjacent end of said tubular housing.*

*25. The sight of claim 23 with the area of said white ring being around 120% of the area of said light transmitting end of said capsule.*

*26. The sight of claim 23 with the outside diameter of said white ring being around 149% of the diameter of said light transmitting end of said capsule.*

*27. The sight of claim 23 with said light transmitting end of said capsule having a diameter of around 0.063 inches, and said white ring having an inside diameter of around 0.063 inches and an outside diameter of around 0.094 inches.*

*28. The sight of claim 23 with said outside diameter of said white ring being around 153% of said inside diameter and hence of said predetermined diameter of said light transmitting end of said capsule.*

*29. The sight of claim 23 with said predetermined diameter of said light transmitting end of said capsule and hence said inside diameter being around 0.051 inches, and said white ring having an inside diameter of around 0.051 inches and an outside diameter of around 0.078 inches.*

*30. The sight of claim 23 wherein said white material generally fills said circular cavity and extends axially substantially from said first side to said light transmitting end.*

*31. The sight of claim 23 with said white material at least partially filling said circular cavity and extending axially substantially from said first side of said sight blade to a point at least proximate to said light transmitting end, said white material being in full circumferential engagement with said inside diameter to define with said light transmitting end a white ring to provide improved day sighting for the operator when sighting the weapon.*

*32. A sight for a hand weapon comprising:*

*a sight blade adaptable to be located on the weapon and having a first side of said sight blade adapted to be viewed by the operator in sighting the weapon,*

*a bore located in said sight blade and extending in an axial direction to said first side,*

*a self luminous capsule supported in said sight blade for providing night sighting and having a generally circular light transmitting end of a predetermined diameter and located concentrically within said bore at said first side and defining with said bore an axially extending cavity of a circular shape having generally precise inside and outside diameters surrounding said light transmitting end and defining a predetermined radial width, said predetermined diameter being said inside diameter, a substantially white material located within and at least partially filling said circular cavity, said substantially white material being located wholly inside said bore at said first side and extending axially substantially from said first side of said sight blade to a point at least proximate to said light transmitting end, said white material being in full circumferential engagement with said inside diameter to define with said light transmitting end a white ring to provide improved day sighting for the operator when sighting the weapon.*

* * * * *

UNITED STATES PATENT AND TRADEMARK OFFICE

CERTIFICATE OF CORRECTION

PATENT NO. : RE.35,347

DATED : October 8, 1996

INVENTOR(S) : Glyn A. J. Bindon

It is certified that error appears in the above-indentified patent and that said Letters Patent is hereby corrected as shown below:

Col. 1, line 11, delete "THEINVENTION" and insert --THE INVENTION--.
Col. 1, line 48, delete "an" and insert --art--.
Col. 1, line 59, delete "pan" and insert --part--.
Col. 3, line 57, delete "an" and insert --art--.
Col. 3, line 67, delete "50)" and insert --50--.
Col. 4, line 33, delete "pans" and insert --parts--.
Col. 4, line 36, delete "an" and insert --art--.
Col. 6, line 29, delete "deemed" and insert --defined--.
Col. 7, line 4, delete "fight" and insert --light--
Col. 8, line 20, delete "15" and insert --13--.
Col. 8, line 54, delete "an" and insert --art--.
Col. 10, line 2, claim 7, delete "0.1363" and insert --0.063--.

Signed and Sealed this

Seventeenth Day of December, 1996

*Attest:*

Bruce Lehman

BRUCE LEHMAN

*Attesting Officer*

*Commissioner of Patents and Trademarks*